(12) United States Patent
El Husseini et al.

(10) Patent No.: US 7,782,723 B2
(45) Date of Patent: Aug. 24, 2010

(54) OPTIMUM TRACKING ERROR COMPENSATION FOR IMPROVED OPTICAL DISK PLAYABILITY

(75) Inventors: Mohamad-Hussein El Husseini, Brussels (BE); Stefan Hendrik Guillaume Steven, Eindhoven (NL); Stefan Geusens, Eindhoven (NL); Jeroen Arnoldus Leonardus Johannes Raaymakers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 11/994,533

(22) PCT Filed: Jun. 28, 2006

(86) PCT No.: PCT/IB2006/052167

§ 371 (c)(1),
(2), (4) Date: Jan. 3, 2008

(87) PCT Pub. No.: WO2007/004149

PCT Pub. Date: Jan. 11, 2007

(65) Prior Publication Data
US 2008/0212433 A1    Sep. 4, 2008

(30) Foreign Application Priority Data
Jul. 5, 2005    (EP)    .................................. 05106067

(51) Int. Cl.
*G11B 7/00*    (2006.01)
(52) U.S. Cl. .................................. 369/44.32; 369/47.44
(58) Field of Classification Search ....................... None
See application file for complete search history.

(56) References Cited

U.S. PATENT DOCUMENTS

| | | |
|---|---|---|
| 6,198,085 B1 | 3/2001 | Tateishi |
| 6,236,032 B1 | 5/2001 | Kamiyama |
| 6,259,664 B1 | 7/2001 | Kwag |

(Continued)

FOREIGN PATENT DOCUMENTS

| | | |
|---|---|---|
| EP | 0062464 | 10/1982 |

(Continued)

OTHER PUBLICATIONS

ISR/Written Opinion of the International Searching Authority PCT/IB2006/052167.

*Primary Examiner*—Joseph H Feild
*Assistant Examiner*—Joseph Haley

(57) ABSTRACT

The present invention relates to a method for operating an optical drive system capable of reproducing/recording information from/to an optical carrier (30), wherein a position error and a speed error of a radiation spot (12, 53) on the carrier has been created due to an unreliable error signal which has been generated due to a surface defect (52). The method includes the steps of registering values of e.g. servo signals, determining the occurrence of a defect using a defect detector DEFO (22), generating a first and a second compensation signal and applying these compensation signals to the control system (10) of the optical drive system. The first compensation signal is capable of reducing the speed error and the second compensation signal is capable of reducing the position error. Thus, the application of the compensation signals immediately after the unreliable error signals reduces the position error and the speed error of the focussed radiation spot (12, 53).

11 Claims, 4 Drawing Sheets

U.S. PATENT DOCUMENTS

Figure 1:
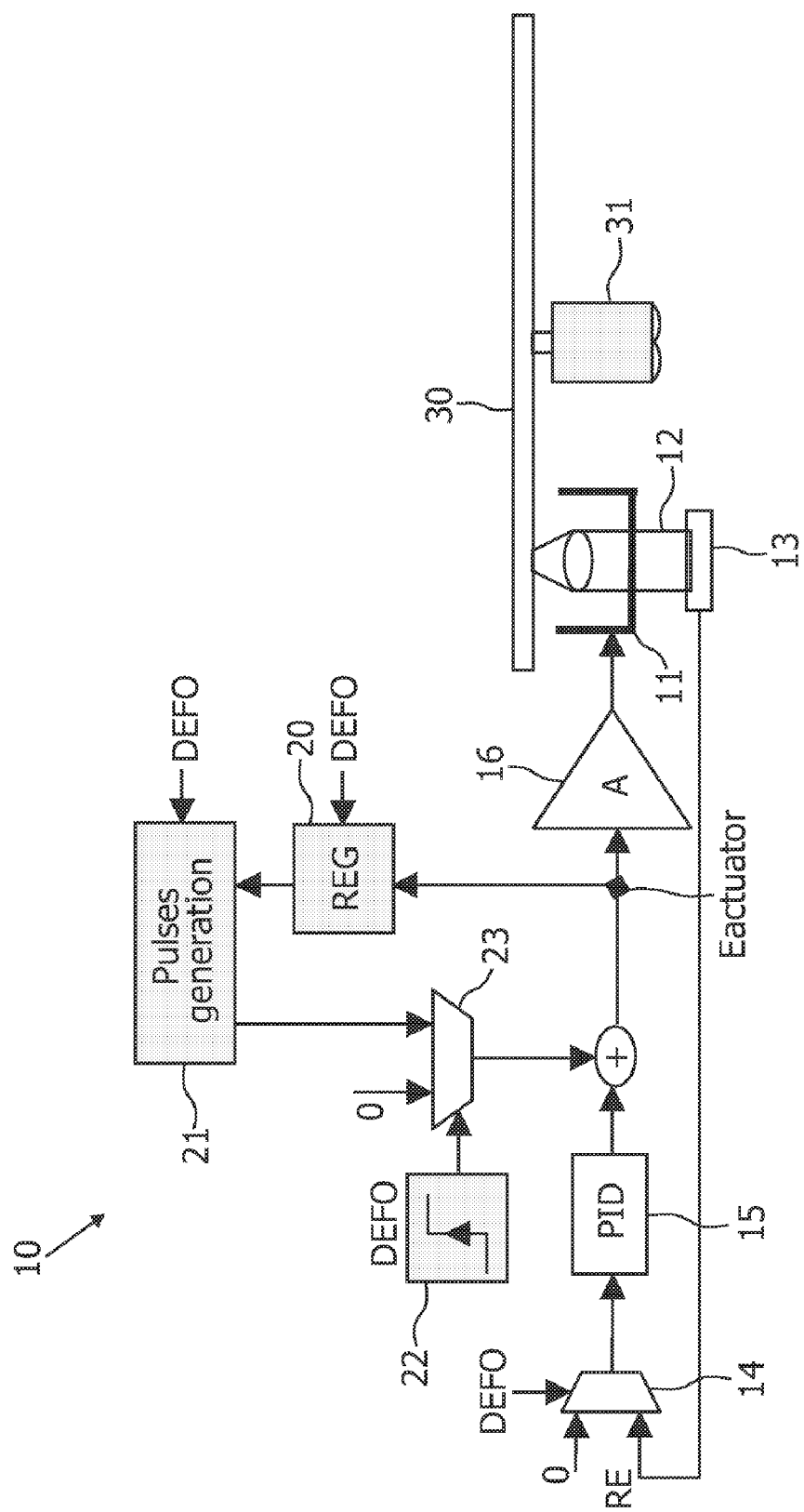

| | | |
|---|---|---|
| 6,483,091 B1 | 11/2002 | Sadler et al. |
| 6,510,112 B1 * | 1/2003 | Sakamoto et al. ........ 369/44.35 |
| 6,947,359 B2 * | 9/2005 | Yokoyama et al. ....... 369/44.29 |
| 7,551,528 B2 * | 6/2009 | Nirei ....................... 369/44.32 |
| 7,593,295 B2 * | 9/2009 | Kim et al. ................. 369/44.32 |
| 2001/0055247 A1 | 12/2001 | Tateishi et al. |
| 2002/0163326 A1 | 11/2002 | Choi et al. |
| 2003/0053381 A1 * | 3/2003 | Takahashi et al. ........ 369/30.24 |

FOREIGN PATENT DOCUMENTS

| | | |
|---|---|---|
| EP | 0847047 | 6/1998 |
| EP | 1178486 A2 | 2/2002 |
| EP | 1450355 A2 | 8/2004 |
| WO | 03098613 | 11/2003 |
| WO | 2004017321 | 2/2004 |

* cited by examiner

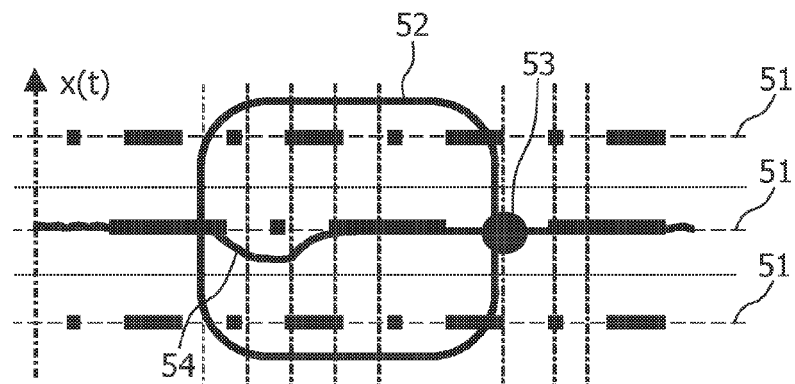
FIG. 4a
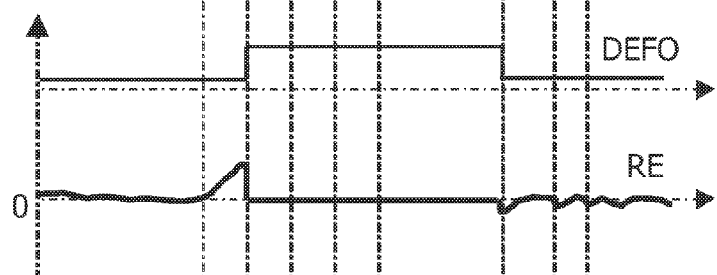
FIG. 4b
FIG. 4c
FIG. 4d
FIG. 4e
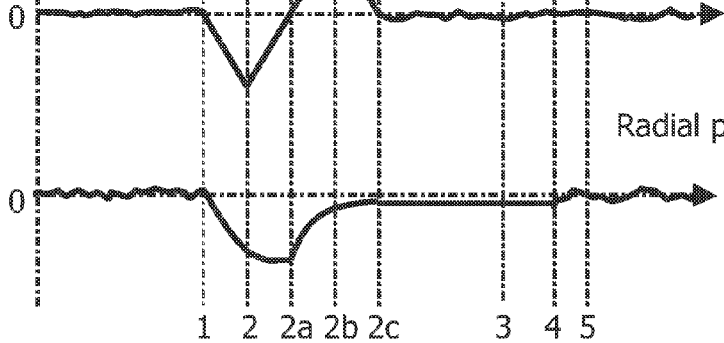
FIG. 4f

OPTIMUM TRACKING ERROR COMPENSATION FOR IMPROVED OPTICAL DISK PLAYABILITY

The present invention relates to a method for operating an optical drive system capable of reproducing/recording information from/to an associated optical carrier, wherein a position error and a speed error of a focussed radiation beam on the carrier has been generated due to a surface defect on the carrier. The invention also relates to a corresponding optical apparatus.

Optical storage of information on optical disk media, such as CD, DVD, BD and HD-DVD, is being increasingly used in more and more applications. The information or the data is arranged in spiral-like tracks and written on and/or read from the optical disk media by a laser unit, the laser unit being positioned in an optical drive device.

Optical disk media will inevitably contain surface defects due to e.g. careless handling by the user and/or manufacturing imperfections. Various kinds of surface defect are known, see e.g. WO 2004/07321 to the same applicant for a categorization scheme of different surface defects; scratches, black dots, finger prints, WO 2004/07321 hereby being incorporated by reference in its entirety. Thus, robust playability and recordability performance of disks with surface defects are an important aspect of optical storage. Several defects management methods are used to deal with disk defects.

However, hitherto proposed solutions have limited performance: the proposed solutions either intervene too late to account for a track-loss situation, or alternatively hinder the overall system performance when fast track-loss detection is absolutely needed. Therefore, the actual state-of-the art in track-loss handling is a trade-off between fast track-loss detection and overall system performance.

One such proposed solution is disclosed in US 2001/0055247. In that reference, a compensation signal is generated and applied to a control system of an optical disc driver immediately after the detection of a surface defect. The application of the compensation signal cancels the power of an accelerating direction caused by a corrupted error signal by the force in the de-accelerating direction generated by the cancel signal. Thus, an error position of the beam relative to a track of the disc is prevented from being shifted gradually during the subsequent defect detection. However, the disclosure of US 2001/0055247 has the disadvantage that an error position of the beam relative to a track is neither reduced nor eliminated.

Hence, an improved optical drive system would be advantageous, and in particular a more efficient and/or reliable correction method for defects would be advantageous.

Accordingly, the invention preferably seeks to mitigate, alleviate or eliminate one or more of the above mentioned disadvantages singly or in any combination. In particular, it may be seen as an object of the present invention to provide a method for correction of defects that solves the above mentioned problems of the prior art, and in particular the disadvantage that an error position of a radiation beam relative to a track is neither reduced nor eliminated. Such disadvantage would otherwise imply an enhanced risk that a laser beam deviates, while crossing the defect, from the desired track to end up on a neighboring track or a distant track at the exit of the defect, which in turn, is particularly fatal for a recording process.

This object and several other objects are obtained in a first aspect of the invention by providing a method for operating an optical drive system capable of reproducing/recording information from/to an associated optical carrier, wherein a position error and a speed error of a focussed radiation spot on the carrier has been generated due to a defect on the carrier, said defect causing a corresponding unreliable error signal and an unreliable servo signal during a first time interval [1,2], said optical drive system comprising:

a control system comprising error detecting means for generating error signals (RE, FE) indicative of a position error of the focussed radiation spot on the carrier, and servo means for generating servo signals (Eactuator), said method comprising the steps of:

registering values of a control signal of said control system said control signal being selected from a group comprising error signals (RE, FE) and servo signals (Eactuator), determining the occurrence of a defect on the associated optical carrier by defect detecting means (DEFO), generating a first compensation control signal on the basis of said registered values, in which said first compensation signal is capable of reducing the speed error of the focussed radiation spot, applying said first compensation control signal to said control system during a second time interval [2,2a] subsequent to said first time interval, generating a second compensation control signal on the basis of said registered values and said first compensation signal, in which said second compensation signal is capable of reducing the position error of the focussed radiation spot, and applying said second compensation control signal to said control system during a third time interval [2a,2c] subsequent to said second time interval.

The invention is particularly, but not exclusively, advantageous for detecting surface defects on a carrier and compensating errors of the radiation spot caused by the defects. Said errors comprise radial position errors and radial speed errors of the radiation beam or spot relative to a track on the carrier, and said errors comprise focus position errors and focus speed errors of the radiation beam relative to a track on the carrier. Thus, the invention is capable of reducing and possibly eliminating said errors of radial speed and focus speed as well as errors of radial position and focus position. The errors are corrected within short time after the detection of the defect so that the reproducing/recording of information from/to a carrier is hardly or not affected by the defect. A main advantage is that a potential track-loss risk when crossing the defect is avoided and/or minimized, thus the risk that a laser beam deviates, while crossing the defect, from one track to end up on a neighboring track or distant track at the exit of the defect is minimized and/or avoided. A further advantage is that the optical drive system does not need time for elimination of errors after the beam has passed the defect since no speed errors or position errors of the beam are present at that moment, thus a delay in the range of 0.1 to 1 ms for repositioning of the beam is avoided.

The errors of radial speed, focus speed, radial position and focus position caused by the defect are corrected or compensated by generation of a first and a second compensation signal. The first compensation signal may be generated so that the magnitude of the time integral of the first compensation signal is adapted to be equal to the magnitude of the time integral of a control signal. Thereby, the first compensation signal is capable of eliminating the speed errors of the radiation beam. The first compensation signal may also be generated so that the magnitude of the time integral of the first compensation signal is adapted to be equal to a constant multiplied by the magnitude of the time integral of a control signal. The multiplication of the time integral with a constant may provide a more accurate control of the actuator, which controls the position, and the speed of the focussed radiation beam. The constant may be in the range from 0.5 to 1, preferably in the range from 0.6 to 0.9, or more preferably in the range from 0.7 to 0.8. The constant may also be in the range from 1 to 1.5, preferably in the range from 1.1 to 1.4 or more preferably in the range from 1.2 to 1.3. Furthermore, the first compensation signal may be scaled in time so that the duration of the compensation signal is decreased and the amplitude is increased while maintaining the value of time integral of the first compensation signal. The time scaling of the first compensation signal may provide a faster and more accurate control of the actuator.

The second compensation signal may be generated as a mirrored signal by mirroring an unreliable control signal and the first compensation signal in the time domain. The mirrored compensation signal within time $2b$ and time $2c$ may be generated so that its time integral is adapted to be equal to the magnitude of the time integral of a control signal within time 1 and time 2. Thereby, the second compensation signal is capable of eliminating the position errors of the radiation beam. The second compensation signal may be scaled in amplitude by multiplying the second compensation signal or part of the compensation signal with a constant. The multiplication of the time integral with a constant may provide a more accurate control of the actuator that controls the position and the speed of the focussed radiation beam. The constant may be in the range from 0.5 to 1, preferably in the range from 0.6 to 0.9, or more preferably in the range from 0.7 to 0.8. The constant may also be in the range from 1 to 1.5, preferably in the range from 1.1 to 1.4 or more preferably in the range from 1.2 to 1.3. Furthermore, the second compensation signal may be scaled in time so that the duration of the compensation signal is decreased and the amplitude is increased while maintaining the value of time integral of the second compensation signal. Thus, the time scaling of the second compensation signal may provide a faster and more accurate control of the actuator.

It is an advantage that the first and/or second compensation signal may be generated so as to satisfy a solution of an electromechanical model of the actuator means, so that said solution is capable of reducing the speed error and/or the position error of the focussed radiation spot. The compensation signals based on solutions to the model may provide a more accurate control of the actuator, and, thus provide a more accurate control of the focussed radiation beam.

The first and/or second compensation signals may be applied to the control system by adding and/or subtracting the compensation signals to/from a signal path of the control system. The compensation signals may be applied to different signal paths of the control system such as the output of the error detection means, the input to the regulation means and the output of the regulation means. The compensation signals may be applied to the control system by use of analog adding and subtracting circuits or the compensation signal may be applied digitally to the control system in a central processing unit. Thus, the means for generation of compensation signals may advantageously be integrated with the control system or parts of the control system in a single, central processing unit.

It is an advantage of the present invention that switching means may be used for switching the input to the servo means to zero when a defect is detected and for switching the input to the servo means to the error signal when no defect is detected. Thus, it is an advantage that the switching means may be integrated with the control system in a single central processing unit.

It is another advantage of the present invention that switching means may be used for switching the output from the compensation signal generation means to zero when no defect is detected and for switching the output from the compensation signal generation means to any of the first and second compensation signals when a defect is detected. Thus, in effect the first and/or second compensation signal is set to zero when no defect is detected. It is an advantage that the switching means may be integrated with the control system in a single central processing unit.

The occurrence of a defect on the carrier may be determined by defect detecting means, wherein the defect detecting means compares the radiation reflected from the carrier with a threshold value and generates a signal indicating the presence of a defect if the amount of reflected radiation crosses or approaches the threshold value.

In a second aspect, the present invention relates to an apparatus for operating an optical drive system capable of reproducing/recording information from/to an associated optical carrier, wherein a position error and a speed error of a focussed radiation spot on the carrier has been generated due to a surface defect on the carrier, said defect causing a corresponding unreliable error signal and an unreliable servo signal during a first time interval, the apparatus comprises:

a control system comprising error detecting means for generating error signals (RE, FE) indicative of a position error of the focussed radiation spot on the carrier, and servo means for generating servo signals (Eactuator), and the apparatus further comprises:

storage means for registering values of a control signal of said control system, said control signal being selected from a group comprising error signals (RE, FE) and servo signals (Eactuator), surface defect detecting means (DEFO) for determining the occurrence of a defect on the associated optical carrier, signal generation means for generating a first compensation control signal on the basis of said registered values, in which said first compensation signal is capable of reducing the speed error of the focussed radiation spot, signal coupling means for applying said first compensation control signal to said control system during a second time interval subsequent to said first time interval, signal generation means for generating a second compensation control signal on the basis of said registered values and said first compensation signal, in which said second compensation signal is capable of reducing the position error of the focussed radiation spot, signal coupling means for applying said second compensation control signal to said control system during a third time interval subsequent to said second time interval.

It is an advantage of the present invention that radial and/or focus position errors and radial and/or focus speed errors of the radiation beam or spot relative to a track on the carrier can be reduced or even eliminated by generation of compensation signals and by application of the compensation signals to the control system. It is a further advantage of the present invention that the risks of track-loss of the radiation beam relative to a track on the carrier can be reduced or even eliminated by generation of compensation signals and by application of the compensation signals to the control system. The compensation signals are generated by signal processing means on basis of registered values of a control signal from a storage means and the compensation signals are applied to the control system by use of signal coupling means.

In a third aspect, the invention relates to a computer program product being adapted to enable a computer system comprising at least one computer having data storage means associated therewith to control an optical recording apparatus according to the third aspect of the invention.

This aspect of the invention is particularly, but not exclusively, advantageous in that the present invention may be implemented by a computer program product enabling a computer system to perform the operations of the first aspect of the invention. Thus, it is contemplated that some known optical reproducing/recording apparatus may be changed to operate according to the present invention by installing a computer program product on a computer system controlling the said optical reproducing/recording apparatus. Such a computer program product may be provided on any kind of computer readable medium, e.g. magnetically or optically based medium, or through a computer based network, e.g. the Internet.

The first, second, and third aspect of the present invention may each be combined with any of the other aspects. These and other aspects of the invention will be apparent from and elucidated with reference to the embodiments described hereinafter.

Figure 2:
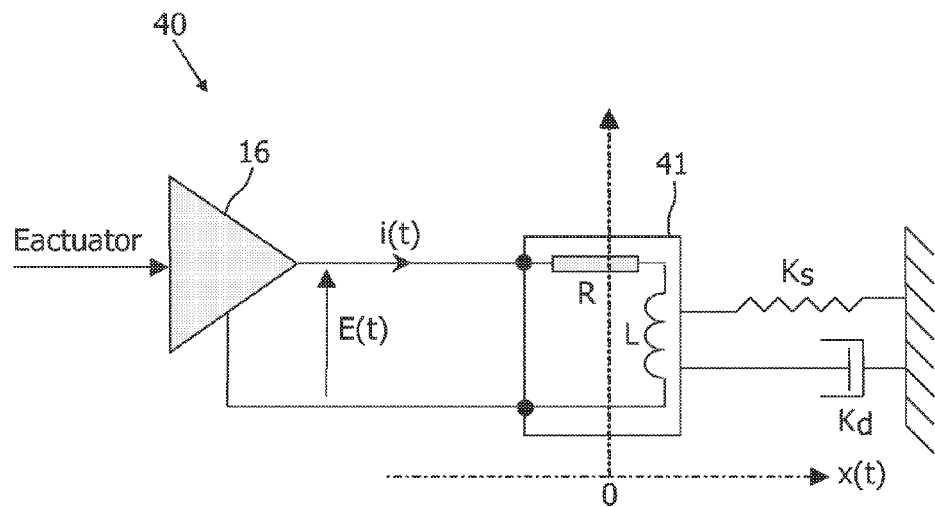
Figure 3:
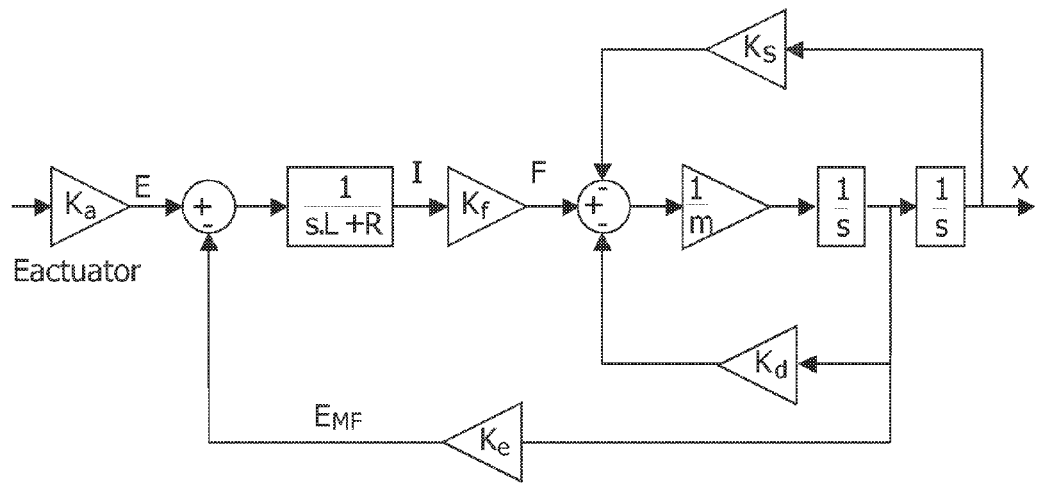
Figure 5:
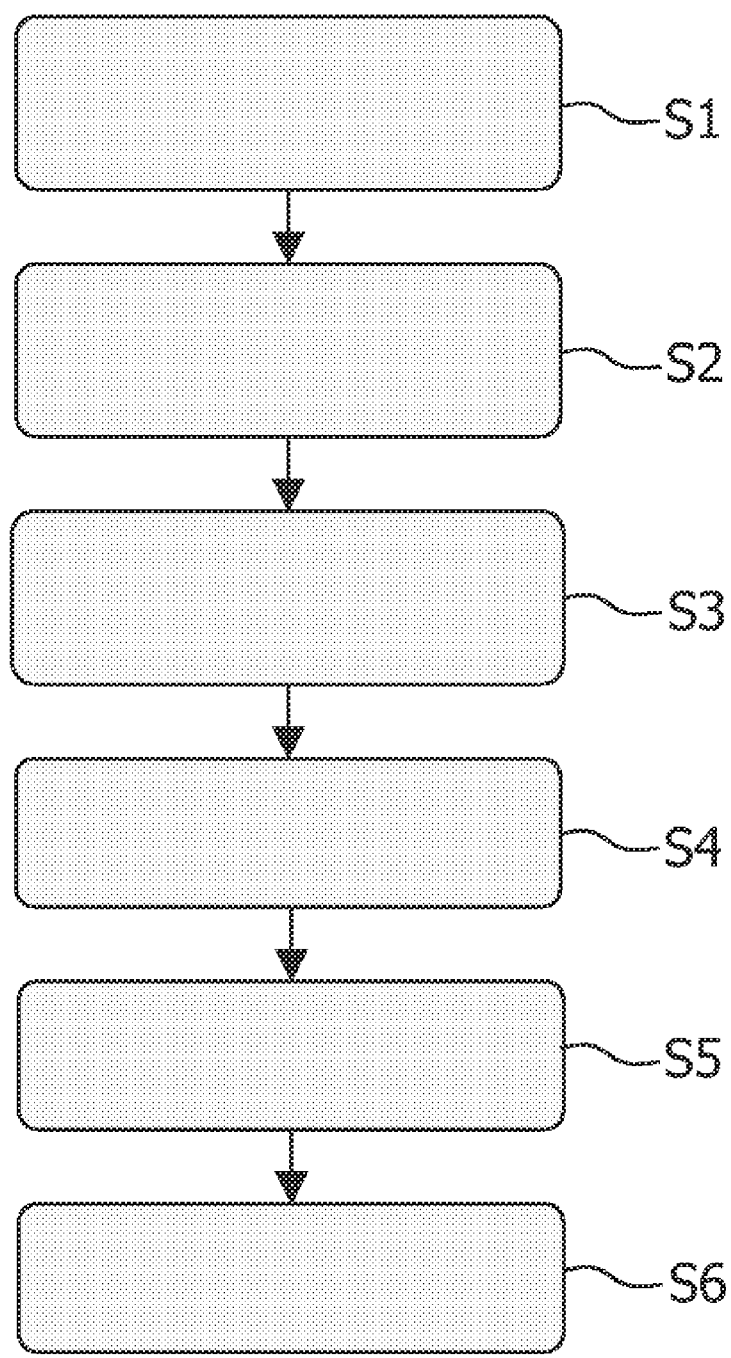

The present invention will now be explained, by way of example only, with reference to the accompanying Figures, where FIG. 1 illustrates a control system for controlling the error of a focussed radiation beam on the carrier, FIG. 2 illustrates an electromechanical model of an actuator of a control system, FIG. 3 shows a Laplace domain transform of an electromechanical model, FIG. 4 schematically illustrates the time-dependences, in the presence of a surface defect, between the trajectory of a focused radiation beam on a carrier and error signals, servo signals, speed and position of a focused radiation beam on a carrier, and FIG. 5 is flow-chart for illustrating the method according to the invention.

The invention provides a method for improving the playability and recordability of an optical drive system capable of reproducing information from an associated optical carrier 30 and/or recording information on an associated optical carrier 30. The presence of defects on the carrier, such as fingerprints, scratches, black dots ect. may cause the focus control system and the radial control system to lose the track of a carrier. The invention provides a method that, subsequent to a detection of a defect, reduces or eliminates the focus error FE and the radial error RE by calculating compensation signals that are injected into the control system.

FIG. 1 illustrates the radial control system 10 for controlling the radial error RE of a focussed radiation beam on the carrier 30. The radial control system comprise an actuator means 11 for adjusting the radial position of the focussed radiation beam 12 on the associated carrier 30 being held and rotated by a motor and holding means 31. Said actuator means 11 comprise fine positioning actuator means with nanometer resolution capabilities and coarse positioning actuator means with micrometer resolution capabilities. A part of the beam 12 being reflected from the carrier impinges on an error detecting means 13 that outputs a radial error signal RE indicative of the radial error RE. The error detector means 13 may be a four-quadrant photo detector with accompanying electronic processing circuits. The radial error signal RE is inputted to a switching means 14 such as a multiplexer and the output from the switching circuit is inputted to a regulation means PID 15. The servo signal Eactuator, outputted from the regulation means is amplified in an amplifier means 16 and from the output of the amplifier the servo signal Eactuator is inputted to the actuator 11 for driving the actuator 11.

The signals related to the control system 10 are collectively referred to as control signals. The control signals comprise error signals, and said error signals comprise radial error signals RE and focus error signals FE. Additionally, the control signals comprise servo signals, and said servo signals comprise the output signal of the regulations means 15 and the output signal of the amplification means 16.

The control system comprises registering means REG 20 which registers at least one of the samples of a control signal. The register may be a shift register or a random access memory (RAM). The registered values of the register is sent to a processing means 21 for generation of a compensation signal which is inputted to a switching means 23.

The output of the switching means 23 are applied to the control system 10 by adding/subtracting the output of the switching means 23 to a signal path of the control system 10 such as the output of the error detection means 13, the input to the regulation means 15 and the output of the regulation means 15, wherein the adding and subtraction may be carried out by use of analog adding and subtraction circuits or the adding and subtraction may be carried out digitally in a central processing unit.

The control system schematically illustrated in FIG. 1 is an embodiment of one such control system 10, however other schematics of a control system 10 with similar or equal function may be constructed. Thus, the amplifier 16 may be omitted or integrated with other components of the control system, the switching devices 14 and 23 may be omitted or replaced with other devices with a similar function, the register REG 20 and the processing means 21 may be combined into one unit and the regulation means PID 15 may be based on any control law known in the state of the art such as Proportional-Integration-Differentiation (PID) control laws. Furthermore, any of the components depicted in the control system may be combined into a single central processing unit (CPU). As an example the switching circuits 14 and 23, the regulation means PID 15, the register REG 20, the processing means 21 and the defect detecting means 22 to be described in the following may be combined in one unit.

The defect detecting means DEFO 22 in FIG. 1 outputs a defect signal DEFO indicative of a defect on the carrier 30. If the focussed radiation beam encounters a surface defect on the carrier 30 a smaller amount of radiation will be reflected from the carrier onto the error detecting means 13 and if the amount of reflected radiation crosses a certain threshold value the defect detecting means DEFO 22 will generate an output signal DEFO that indicates the presence of a defect on the carrier 30. The defect signal DEFO from the defect detecting means DEFO 22 may for instance change from a low to a high digital value or from a high to a low digital value when the defect is detected. The defect detecting output signal DEFO is inputted both to the switching circuit 14 and to the switching circuit 23. The switching circuit 14 has two inputs: A zero value and an error signal such as a radial error signal RE. The switching circuit 23 also has two inputs: A zero value and the compensation signal from the processing means 21. When no defect is present on the carrier 30 the output signal from the defect detecting means DEFO 22 sets the output of the switching circuit 14 to be the radial error signal and the output of the switching circuit 23 to be the zero value. When a defect is present on the carrier 30 the output signal from the defect detecting means DEFO 22 sets the output of the switching circuit 14 to be the zero value and the output of the switching circuit 23 to be the compensation signal. As shown in FIG. 1 the defect signal DEFO may also be applied to the processing means 21 and the register REG 20.

The generation of any of the first compensation signal and the second compensation signal may be performed continuously during the reproducing/recording of information from/to a carrier 30 or it may be performed only upon request when the change in the defect detection signal DEFO indicates the presence of a defect 52.

The description of the radial error control system 10 and the illustration in FIG. 1 applies equally well for the radial control system as for the focus control system, the latter controlling the focus error FE of a focussed radiation beam in which case the error detector 13 outputs a focus error signal FE and the actuator means 11 is capable of controlling the focus position of the focussed radiation beam 12. Thus, the actuator means 11 may be capable of controlling both the radial position and the focus position. Due to the similarity of the two control systems a detailed description of the focus control system will be omitted, but the skilled person may equally apply the principles of the present invention on a focus control system.

FIG. 2 illustrates an electromechanical model 40 of the actuator 11 of the control system 10, said electromechanical model comprising a moving part 41, a resistor R, an inductor L, a spring $K_s$ and a damping element $K_d$. The electrical part of the electro-mechanical model 40 is supplied with a voltage E(t) and a current i(t). The position of the moving part 41 is given by x(t). The amplifier means 16 also depicted in FIG. 2 generates the voltage E(t) and the current i(t) when supplied with the servo signal Eactuator. The electromechanical model 40 can be modelled with the equations Eq1, Eq2, Eq3 and Eq4 given below.

The mechanical position x(t) of the moving part is given as a solution to Eq1:

$$F(t) = m\frac{d^2 x(t)}{dt^2} + K_d \frac{dx(t)}{dt} + K_s x(t) \quad \text{Eq 1}$$

where:

F(t): is the total force applied on the actuator (the Lorenz force in this case) [N], m: is the mass of the moving part of the actuator [Kg], $K_d$: is the damping constant [N·s/m], $K_s$: is the spring constant [N/m].

The electromechanical relations are given by Eq2 and Eq3:

$$F(t) = K_f i(t) \quad \text{Eq2:}$$

$$E_{MF}(t) = K_e \frac{dx(t)}{dt} \quad \text{Eq 3}$$

where:

i(t): is the current injected by the power drive into the coil [A], $E_{MF}(t)$: is the electromotive force generated by a coil moving in a magnetic field [V], $K_f$: is a force constant [N/A], $K_e$: is an electric constant [V·s/m].

The electrical relation are given by Eq4:

$$E(t) - E_{MF}(t) = L\frac{di(t)}{dt} + Ri(t) \quad \text{Eq 4}$$

where:

E(t): is the applied voltage on the coil,

L: is the coil inductance,

R: is the coil resistance.

Solving equations Eq1 to Eq4 allows a precise reconstruction of the curves, in FIG. 4e and FIG. 4f from the curve in FIG. 4d when a proportional gain of the amplifier 16 is assumed. The mentioned curves in FIGS. 4e to 4f will be described in more detail later on.

The electromechanical system can be translated into the linear Laplace (frequency) domain with the servo signal Eactuator as input and the position of the moving part 41 X(s) as output. FIG. 3 depicts such a Laplace domain transform of the electro-mechanical model where the signals in different intermediate stages are deduced from equations Eq1 to Eq4.

FIG. 4 illustrates the time-dependency between the trajectory of the focused radiation beam 53 on a carrier and a defect signal DEFO, a radial error signal RE, an actuator signal Eactuator, a speed signal in FIG. 4e and a position signal in FIG. 4f. FIG. 4a shows three neighboring tracks 51, a defect 52 on the carrier 30, the spot of the focussed radiation beam 12 and 53 and the trajectory of the beam 54. The trajectories are shown schematically and are only indicative of the behaviour of the beam 53.

When the focused radiation beam 12 encounters the defect 52 at time 1, the error detection means generates an unreliable radial error signal RE as shown in FIG. 4c. The regulation means PID 15 generates an unreliable servo signal Eactuator in response to the unreliable radial error signal as shown in FIG. 4d from time 1 to time 2. The duration of the unreliable servo signal Eactuator is typically 0.02 ms to 0.1 ms. The unreliable servo signal causes the radial speed to increase as shown in FIG. 4e and the magnitude of the radial off-track position of the spot 53 to increase as shown in FIG. 4f. The unreliable signals cause the radial speed and the magnitude of the radial off-track position to increase during the time interval from time 1 to time 2. At time 2 the defect detection means DEFO 22 generates a change in the defect signal indicating the presence of a defect as shown in FIG. 4b.

The change in the defect signal DEFO causes the multiplexer 14 to shift the output of the multiplexer to zero as seen in FIG. 4c. The change in the defect signal also causes the generation of a first compensation signal which is added to the output of the regulation means PID 15 during the period from time 2 to time 2a. The effect of the first compensation signal is a reduction of the relative radial speed as shown in FIG. 4e and a stabilisation of the radial position as shown in FIG. 4f. During the period from time 2a to time 2c the second compensation signal is generated and added to the output of the regulator PID 15. The effect of the second compensation signal is an increase of the relative radial speed from time 2a to time 2b and a reduction of the relative radial speed from time 2b to time 2c so that the radial speed at time 2c approaches a zero value. Another effect of the second compensation signal is a reduction of the radial position from time 2a to time 2c so that the radial position approaches zero at time 2c i.e. the spot 53 becomes on track again. At time 3 where the beam has passed the defect 52, the defect detection means 22 generates a change in the defect signal indicating that no defects are present and the multiplexer 14 shifts the output of the multiplexer from zero to the radial error signal RE which is now reliable, thus aborting the defect correction method and re-establishing the radial control system and the focus control system which are now using the reliable radial error signal RE for generation of a servo signal Eactuator.

The first compensation signal is generated so that the magnitude of the time integral of the first compensation signal is adapted to be equal to the magnitude of the time integral of a control signal. Alternatively, the first compensation signal is generated so that the magnitude of the time integral of the first compensation signal is adapted to be equal to the multiplication of a constant and the magnitude of the time integral of a control signal. Furthermore, the first compensation signal may be scaled in time so that the duration of the compensation signal is decreased and the amplitude is increased while maintaining the value of the time integral of the first compensation signal.

The second compensation signal is generated by mirroring the unreliable control signal as shown in FIG. 4d within time 1 to time 2 and the first compensation signal as shown in FIG. 4d within time 2 to time 2a. The signals are mirrored in the time domain about a time line corresponding to time 2a, which results in a second compensation signal being applied to the control system during the period within time 2a to 2c. In general, the shape of the second compensation signal is dependent on the choice made for the first compensation signal. The second compensation signal may be scaled in amplitude by multiplying the second compensation signal or part of the compensation signal with a constant. Furthermore, the second compensation signal may be scaled in time so that the duration of the compensation signal is decreased and the amplitude is increased while maintaining the value of time integral of the second compensation signal.

The calculation of the magnitude of the time integral of a control signal used for generation of the first compensation signal may be calculated continuously by using a running integrator means representing the area of the control signal over a predefined time window, where the length of the time window is defined by a number of samples, e.g. 1 to 10 samples or equivalently the length of the time window is defined as a duration of a time period, e.g. a duration of 100-200 micro seconds. Similarly, the calculation of the mirrored signal of the unreliable control signal in the period within time 1 to time 2 and the first compensation signal in the period within time 2 to time 2a shown in FIGS. 4d-4e may be calculated continuously on basis of the values of the unreliable control signal within time 1 to time 2 and the first compensation signal within time 2 to time 2a.

In another embodiment, the first and/or second compensation signal are/is generated so as to satisfy a solution of an electromechanical model of said actuator means, said solution being capable of reducing the speed error and the position error of the focussed radiation spot.

Occasionally, the duration of the period within time 1 to time 2 in which the errors of speed and position are generated is of the same order of magnitude or larger than the duration of the period within time 2 to time 3 in which the first and second compensation signals are generated and applied to the control system and in which the defect signal indicates the presence of a defect. In this case, the compensation signals are also capable of reducing the errors of speed and position, although the errors may not be completely eliminated. Thus, if the situation occurs in which only part of the compensation signals have been applied to the control system 10 when the defect detection signal DEFO in FIG. 4b becomes low two possibilities exists: Either the rest of the compensation signal is outputted or the defect correction method is aborted and the radial control system and the focus control system which are using the reliable radial error signal RE for generation of a servo signal Eactuator are re-established.

FIG. 5 is flow-chart for illustrating the method according to the invention.

In a first step S1, values of a control signal of the control system 10 are registered in registering means REG 20 such a register.

In a second step S2, the occurrence of a defect on the carrier 30 is detected by surface defect detecting means DEFO 22.

In a third step S3, a first compensation control signal is generated by processing means 21 on the basis of the registered values form the register REG 20, wherein the first compensation signal is capable of reducing or eliminating the speed error of the focussed radiation spot.

In a fourth step S4, the first compensation control signal is applied to the control system by use of analog adding or subtraction means or by use of digital adding or subtraction means.

In a fifth step S5, a second compensation control signal is generated by processing means 21 on the basis of the registered values from the register REG 20, wherein the second compensation signal is capable of reducing or eliminating the position error of the focussed radiation spot.

In a sixth step S6, the second compensation control signal is applied to the control system by use of analog adding or subtraction means or by use digital adding or subtraction means.

In another embodiment the steps of S4-S6 of the flowchart in FIG. 5 may have an order so that, In a forth step S4, a second compensation control signal is generated by processing means 21 on the basis of the registered values from the register REG 20, wherein the second compensation signal is capable of reducing or eliminating the position error of the focussed radiation spot.

In a fifth step S5, the first compensation control signal is applied to the control system by use of analog adding or subtraction means or by use digital adding or subtraction means.

In a sixth step S6, the second compensation control signal is applied to the control system by use of analog adding or subtraction means or by use digital adding or subtraction means.

Although the present invention has been described in connection with the specified embodiments, it is not intended to be limited to the specific form set forth herein. Rather, the scope of the present invention is limited only by the accompanying claims. In the claims, the term comprising does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for operating an optical drive system capable of reproducing/recording information from/to an associated optical carrier (30), wherein a position error and a speed error of a focussed radiation spot (12,53) on the carrier has been generated due to a surface defect (52) on the carrier, said defect causing a corresponding unreliable error signal and an unreliable servo signal during a first time interval ([1,2]), said optical drive system comprising:

a control system (10) comprising error detecting means (13) for generating error signals (RE, FE) indicative of a position error of the focussed radiation spot on the carrier, and servo means (15, 16) for generating servo signals (Eactuator), said method comprising the steps of:

registering values of a control signal of said control system, said control signal being selected from a group comprising error signals (RE, FE) and servo signals (Eactuator), determining the occurrence of a defect on the associated optical carrier by surface defect detecting means (DEFO), generating a first compensation control signal on the basis of said registered values, in which said first compensation signal is capable of reducing the speed error of the focussed radiation spot, applying said first compensation control signal to said control system during a second time interval (2,2a) subsequent to said first time interval, generating a second compensation control signal on the basis of said registered values and said first compensation signal, in which said second compensation signal is capable of reducing the position error of the focussed radiation spot, and applying said second compensation control signal to said control system during a third time interval (2a,2c) subsequent to said second time interval.

2. A method according to claim 1, wherein said servo means comprise regulation means (15) and amplification means (16) for generation of servo signals capable of driving the one or more actuator means (11), said actuator means being adapted for controlling the position of said focussed radiation beam on the carrier (30).

3. A method according to claim 1, wherein the magnitude of the time integral of the first compensation signal is adapted to be substantially equal to the magnitude of the time integral of a control signal (RE, FE or Eactuator).

4. A method according to claim 1, wherein the second compensation signal is generated by mirroring the unreliable control signal and the first compensation signal in the time domain.

5. A method according to claim 1, wherein the first and/or second compensation signal are/is generated so as to satisfy a solution of an electromechanical model (40) of said actuator means (11), said solution being capable of reducing the speed error and the position error of the focussed radiation spot.

6. A method according to claim 2, wherein said first and/or second compensation signals are applied to the control system (10) by adding/subtracting the compensation signals to/from a signal path of the control system, said signal path being selected from a group comprising: the output of said error detection means (13), the input to said regulation means (15) and the output of said regulation means.

7. A method according to claim 1, wherein the input to said servo means is set to zero when a defect is detected by the defect detecting means.

8. A method according to claim 1, wherein said first and/or second compensation signal are set to zero when no defect is detected.

9. A method according to claim 1, wherein the occurrence of a defect on the associated optical carrier (30) is determined by defect detecting means (DEFO, 22), wherein the defect detecting means compares the radiation reflected from the carrier with a threshold value and generates a signal indicative of the defect depending on the result of the comparison.

10. An apparatus for operating an optical drive system capable of reproducing/recording information from/to an associated optical carrier (30), wherein a position error and a speed error of a focussed radiation spot (12, 53) on the carrier has been generated due to a surface defect (52) on the carrier, said defect causing a corresponding unreliable error signal and an unreliable servo signal during a first time interval ([1,2]), the apparatus comprises:

a control system comprising error detecting means (13) for generating error signals (RE, FE) indicative of a position error of the focussed radiation spot on the carrier, and servo means (15, 16) for generating servo signals (Eactuator), and the apparatus further comprises:

storage means (20) for registering values of a control signal of said control system, said control signal being selected from a group comprising error signals (RE, FE) and servo signals (Eactuator), surface defect detecting means (DEFO, 22) for determining the occurrence of a defect on the associated optical carrier, signal generation means (21) for generating a first compensation control signal on the basis of said registered values, in which said first compensation signal is capable of reducing the speed error of the focussed radiation spot, and signal coupling means for applying said first compensation control signal to said control system during a second time interval (2,2a) subsequent to said first time interval, signal generation means (21) for generating a second compensation control signal on the basis of said registered values and said first compensation signal, in which said second compensation signal is capable of reducing the position error of the focussed radiation spot, signal coupling means for applying said second compensation control signal to said control system during a third time interval (2a,2c) subsequent to said second time interval.

11. An optical drive system capable of reproducing/recording information from/to an associated optical carrier (30), comprising an apparatus as claimed in claim 10.

* * * * *